(12) United States Patent
Sampson (10) Patent No.: US 9,603,310 B2
(45) Date of Patent: Mar. 28, 2017

(54) LOPPING SHEARS WITH OFFSET BLADE

(71) Applicant: James M. Sampson, Southfield, MI (US)

(72) Inventor: James M. Sampson, Southfield, MI (US)

(*) Notice: Subject to any disclaimer, the term of this patent is extended or adjusted under 35 U.S.C. 154(b) by 181 days.

(21) Appl. No.: 14/497,750

(22) Filed: Sep. 26, 2014

(65) Prior Publication Data
US 2016/0088801 A1  Mar. 31, 2016

(51) Int. Cl.
*A01G 3/08* (2006.01)
*A01G 3/025* (2006.01)
*B26B 13/28* (2006.01)
*B26B 13/26* (2006.01)

(52) U.S. Cl.
CPC ............ *A01G 3/0251* (2013.01); *B26B 13/26* (2013.01); *B26B 13/28* (2013.01)

(58) Field of Classification Search
CPC ............................... A01G 3/0251; B26B 13/26
USPC .......... 30/244, 245, 250, 251, 249, 248, 257
See application file for complete search history.

(56) References Cited

U.S. PATENT DOCUMENTS

| | | | | |
|---|---|---|---|---|
| 1,439,225 | A | * | 12/1922 | Cashman ............ A01G 3/0251 30/251 |
| 5,761,815 | A | * | 6/1998 | Lin ...................... A01G 3/0251 30/140 |
| 6,640,442 | B2 | * | 11/2003 | Lin ...................... A01G 3/0251 30/249 |
| 8,220,163 | B2 | | 7/2012 | Linden et al. |
| 2009/0293288 | A1 | * | 12/2009 | Hernandez ............ B26D 3/169 30/251 |
| 2013/0008563 | A1 | | 1/2013 | Reh |
| 2014/0357173 | A1 | | 12/2014 | Woller, Jr. et al. |

FOREIGN PATENT DOCUMENTS

| | | |
|---|---|---|
| CN | 201315768 Y | 9/2009 |
| CN | 202310662 U | 7/2012 |
| CN | 202680046 U | 1/2013 |

* cited by examiner

*Primary Examiner* — Omar Flores Sanchez
(74) *Attorney, Agent, or Firm* — Brooks Kushman P.C.

(57) ABSTRACT

Loppers include first and second elongated handles that are both directly connected and indirectly connected through a linkage assembly. The first handle has a static blade having a concave shearing edge extending generally transverse from the longitudinal axis of the first handle. The second handle has a curved end portion that curves toward the first handle and is pivotally secured to the static blade. An articulated blade has a convex cutting edge and is rotatably secured to the static blade. A link connects the curved end portion to an end of the articulated blade. Movement of the second handle relative to the first handle pivots the curved end portion about the static blade, thereby moving the cutting edge relative to the shearing edge via the link. The static blade and articulate blade are offset from the handles and extend generally transverse to the longitudinal axis of the first handle.

18 Claims, 4 Drawing Sheets

LOPPING SHEARS WITH OFFSET BLADE

TECHNICAL FIELD

The present disclosure generally relates to hand-operated shears and, in particular, to shears with elongate handles and an offset blade configured to be operated by two hands.

BACKGROUND

Hand-operated shears have been known for hundreds of years. Pruning shears and lopping shears are two main types of shears for tree trimming or plant pruning.

Pruning shears, also called hand pruners, are typically utilized for trimming plants and small branches of trees and shrubs. Pruning shears can be operated by one hand such that, similar to scissors, movement of the hand-held arms causes two blades to move relative to one another. The handles meet at a pivot point, and the blades extend past the pivot point to form an "X" shape when the pruning shears are open amongst the two handles and the two blades.

Lopping shears, also called loppers, are larger than pruning shears and are typically utilized for larger plants and limbs of trees and shrubs. Loppers typically have extended handles such that a user operates the loppers with both hands, one on each handle. Like pruning shears, the handles and blades of loppers forms an "X" shape when the loppers are open.

Because of the configuration of the blades in relation with the handles, loppers can present a danger if a user is attempting to cut large branches above the user's head. The blades of the loppers extend in the direction of the handles, making it difficult to stand directly below a branch and cut the branch without causing the branch to fall where the user is standing.

SUMMARY

According to one aspect of the present disclosure, a blade shear assembly is provided. First and second elongate handles are coupled to one another and are movable relative to one another. The second handle has an end portion. A static blade extends generally transverse from the first handle. The static blade includes a concave shearing edge and is rotatably connected to the end portion of the second handle. An articulated blade is rotatably connected to the static blade about an intermediate portion of the articulated blade. The articulated blade has a first end and a second end that both extend in opposite directions from the intermediate portion. The first end includes a convex cutting edge formed thereon that faces toward the concave shearing edge of the static blade such that the cutting edge and the shearing edge are both offset from the handles. A link couples the end portion of the second handle to the second end of the articulated blade. Movement of the second handle relative to the first handle causes the end portion and link to rotate about the static blade such that the articulated blade rotates relative to the static blade about the rotation point.

In one embodiment, the first and second handles extend along respective longitudinal axes. When the handles are not exactly parallel, space exists between the axes on opposite sides of the point of intersection of the axes. The cutting edge and the shearing edge are outside of the space when the blade shear assembly is in the closed and open positions.

In one embodiment, the cutting edge and shearing edge each define respective longitudinal axes that extend at an angle between 85-95 degrees (generally perpendicular) from the longitudinal axis of the first handle when in the closed position.

In another embodiment, the cutting edge and shearing edge each define respective longitudinal axes that extend at an angle between 40-50 degrees from the longitudinal axis of the first handle when in the closed position.

A four-bar linkage assembly is defined by portions of the extension link, the link, the articulated blade, and the static blade. The four-bar linkage further includes an input link, a fixed link, a coupler link, and an output link. The input link is formed along the extension link, wherein the input link rotates about a portion of the static blade when the second handle is rotated relative to the first handle. The fixed link is formed along the static blade. The coupler link is formed along the link and connects the input link to the output link. The output link is formed along the articulated blade. The output link pivots about the pivot point as the input link rotates about the portion of the static blade when the second handle is rotated relative to the first handle.

According to another aspect of the present disclosure, a blade shear assembly includes first and second elongated handles coupled to each other and moveable relative to one another. The second handle has a curved end portion. A static blade is located at an end of the first handle and includes a shearing edge. The static blade is pivotally connected to the curved end portion of the second handle. An articulated blade is rotatably connected to the static blade about a rotation point. The articulated blade has a cutting edge for cooperating with the shearing edge to trim a branch, tree limb, or the like. A link couples the curved end portion of the second handle to the articulated blade about to provide rotational movement of the articulated blade about the rotation point as the second handle is moved relative to the first handle.

According to yet another aspect of the present disclosure, lopping shears include a first handle extending along a first axis, and a second handle extending along a second axis that is generally parallel to the first axis when the lopping shears are in a closed position. A static blade extends from the first handle. An articulated blade is pivotally connected to the static blade. A link pivotally connects the articulated blade to an end portion of the second handle. The static blade and the articulated blade extend in a direction generally perpendicular to the first axis when the lopping shears are in a closed position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
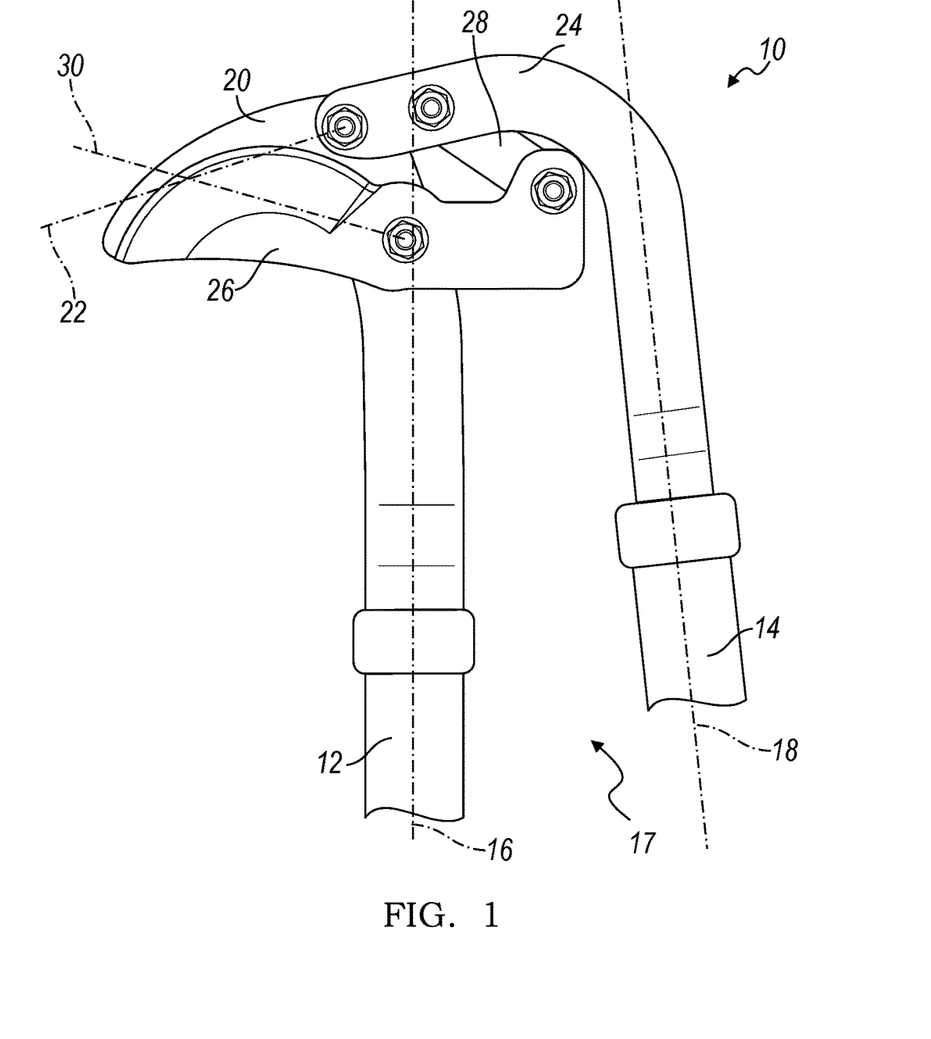
FIG. 1 is a partial front view of lopping shears in a closed position according to one embodiment.

Referring to FIG. 1, a pair of lopping shears, also referred to as a blade shear assembly or a lopper 10, is illustrated. The lopper 10 includes a first handle 12 and a second handle 14. The handles are each elongated (e.g., between two and five feet long) along respective longitudinal axes 16, 18 and may each provide a gripping area for a user's hands. The first handle 12 ends at a static blade 20 having a longitudinal axis 22. The second handle 14 ends in a curved end portion 24. The end portion 24 is connected to an articulated blade 26 via a link 28. The articulated blade also has a longitudinal axis 30. The articulated blade 26 is also rotatably connected to an attachment portion of the static blade 20. Movement of the second handle 14 relative to the first handle 12 causes the end portion 24 to pivot about the static blade 20, which also rotates the link 28. Rotation of the link 28 causes one end of the articulated blade 26 to pivot about an intermediate portion of the articulated blade, while the opposite end of the articulated blade 26 opens or rotates away from the static blade 20. In other words, the articulated blade 26 rotates relative to the static blade 20 about an intermediate rotational point connecting both blades. This motion opens and closes the blades 20, 26 relative to one another, allowing the user to cut a tree branch, limb or the like. Additional detail of the lopper 10 is provided below with reference to FIGS. 2 and 3.

Figure 2:
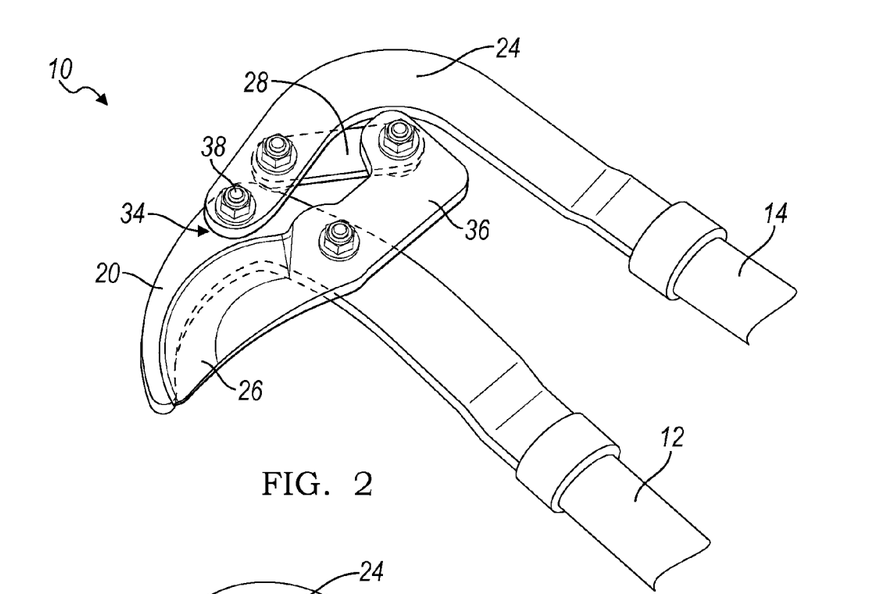
FIG. 2 is a partial perspective view of the lopping shears in the closed position in more detail.
Figure 3:
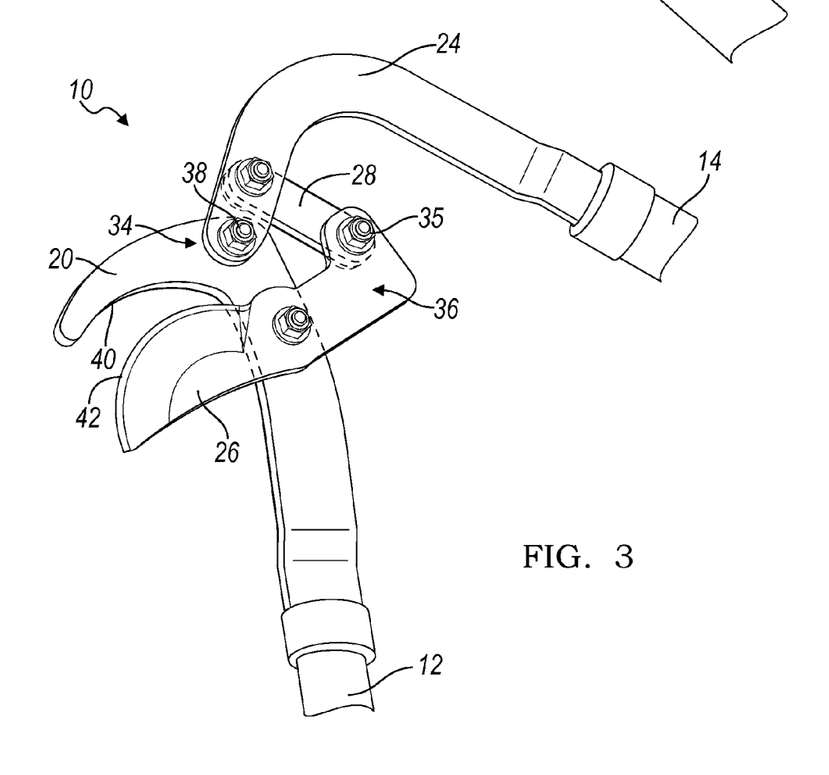
FIG. 3 is a partial perspective view of the lopping shears in an open position.

Referring to FIGS. 2 and 3, the lopper 10 is shown in a closed position and an open position, respectively. In the closed position, the first and second handles 12, 14 are generally parallel. The articulated blade 26 may be partially covering the static blade 20 from above, or may be mated or otherwise connected with a surface of the static blade 20. By moving the handles 12, 14 away from each other, the end portion 24 pivots about the static blade 20, causing the articulated blade 26 to open away from the static blade 20, as shown in FIG. 3.

The end portion 24 is curved, cornered, or otherwise transverse to the second handle 14 and extends between the handles 12, 14 toward the first handle 12. The end portion 24 pivotally connects to an attachment portion 34 of the static blade 20. Thus the handles 12, 14 are not connected at an intersection of their longitudinal axes to form a traditional "X" shape. This indirect or offset connection enables rotation of offset blades, as will be further discussed below.

As made possible by bolts, rivets, or other such connections 35, several parts of the lopper 10 are rotatably connected. This provides a distinct advantage in not only allowing the blades to be offset form the handles (as will be discussed further), but also by providing mechanical advantage when the lopper 10 is used for cutting. In particular, while the end portion 24 is directly rotatably connected to the attachment portion 34 of the static blade 20, the end portion 24 is also indirectly rotatably connected to an attachment portion 36 of the articulated blade 26 via link 28. When the second handle 14 moves relative to the first handle 12 to close the lopper, the articulated blade 26 is able to rotate at a slower revolutionary speed than that of the second handle 14 due to the connection of the link 28. This, along with the moment arm created by the elongate handle 14, provides an increased amount of torque at the articulated blade 26 while reducing the necessary force needed to cut a branch, for example.

In the closed position (shown in FIG. 2), the longitudinal axes of the handles 12, 14 may be generally parallel (i.e., are parallel or may intersect at a location far removed from the handles themselves). In this closed position, the static blade 20 and the articulated blade 26 may overlap. As the lopper 10 is transitioned into an open position (shown in FIG. 3), the end portion 24 pivots about a pivot point 38 and with respect to the attachment portion 34 of the static blade 20. The longitudinal axes 16, 18 intersect, with their intersection point moving closer to the lopper 10 as the lopper is opened. This causes the link 28 to rotate or orbit about the pivot point 38 and about the static blade 20 with movement of the end portion 24 of the handle 14.

As previously described, the link 28 provides an indirect connection between the end portion 24 and the articulated blade 26. In this fashion, a portion of the rotational movement of the second handle 14 is translated into rotational movement of the link 28 about the end portion 24. This provides a spatial separation between the end portion 24 and the articulated blade 26 when the lopper 10 is in the open position. When the lopper 10 is moved toward the closed position, the spatial separation decreases as the link 28 causes the articulated blade 26 to rotate. The indirect connection between the end portion 24 and the articulated blade 26 thus provides a larger degree of freedom of movement between the handles 12, 14 compared to an arrangement in which the end portion 24 is directly connected to the articulated blade 26.

The static blade 20 includes a shearing edge 40. The articulated blade 26 includes a cutting edge 42. In use, moving the lopper 10 into the open position causes the articulated blade 26 to rotate, in which the cutting edge 42 separates from the shearing edge 40. Once the lopper 10 is in the open position, a branch, twig, or other object can be placed between the shearing edge 40 and the cutting edge 42. The user then simply pushes the handles 12, 14 toward one another, causing the components of the lopper 10 to rotate and pivot based on their arrangement as explained above. Rotation of the components causes the cutting edge 42 to move closer to the shearing edge 40 and slice through the object.

It should be understood from the above description that the static blade 20 and the articulated blade 26 are generally offset from the remaining portions of the lopper. In particular, the shearing edge 40 and the cutting edge 42 each have a respective longitudinal axis that is generally transverse (e.g., between 45 and 135 degrees, particularly between 75 and 105 degrees, and more particularly between 85 and 95 degrees) relative to the longitudinal axis of the handle 12. The shearing edge 40 of the static blade 20 and the cutting edge 42 of the articulated blade 26 are each outside of a space 17 defined between the longitudinal axes 16, 18 of the handles 12, 14 during both the open and closed positions.

The location of the shearing edge 40 and the cutting edge 42 being offset to the side of the lopper 10, in combination with the mechanics and rotatable connections described above, enable items such as twigs and branches to be cut and fall to the side of the user. For example, if the user intends to cut a tree branch hanging from a tree, the user can stand underneath and slightly to the side of the branch while holding the lopper 10 directly in-line and above the user's head. This allows the user to maintain proper weight distribution and balance as he/she is holding the lopper aligned with his/her center of gravity, while cutting the branch which is located to the side of the user. After the user cuts the branch, the branch will fall safely to the side of the user rather than falling down on top of the user.

Figure 4:
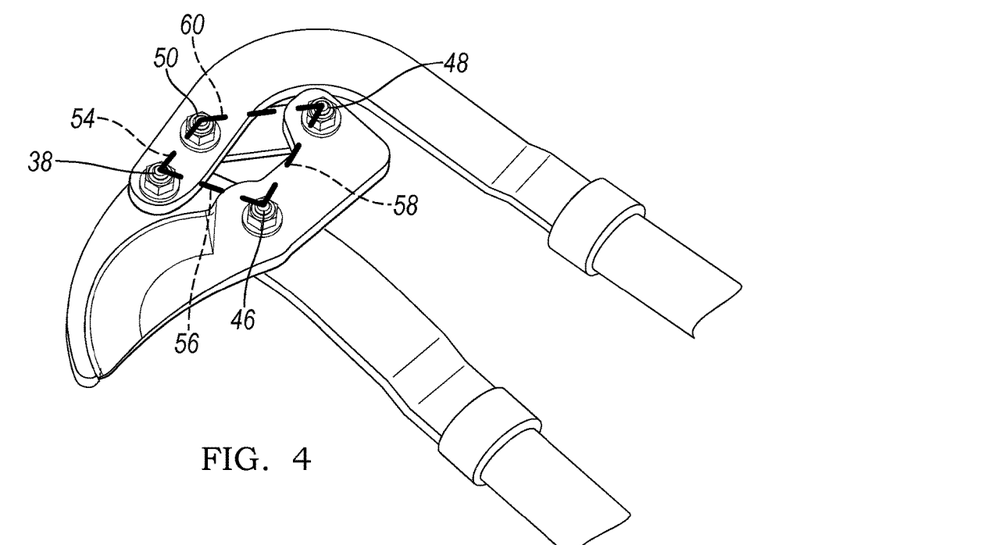
FIG. 4 is a partial perspective view of the lopping shears in a closed position illustrating a four-bar linkage.
Figure 5:
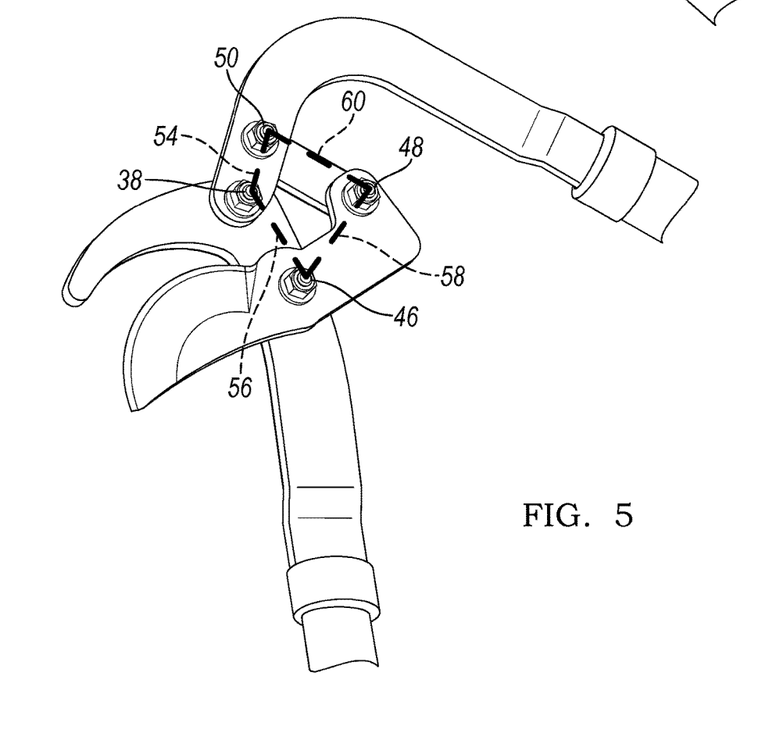
FIG. 5 is a partial perspective view illustrating a change in the four-bar linkage when the lopping shears are in the open position.

Referring to FIGS. 4 and 5, the lopper is again illustrated in the closed and open positions, respectively. A four-bar linkage assembly is also illustrated. Four rotatable points define the corners of the four-bar linkage: (1) the pivot point 38 at the connection between the end portion 24 and the attachment portion 34 of the static blade 20, (2) rotation point 46 at the intermediate portion of the articulated blade 26 that defines the point of rotation of the articulated blade 26 relative to the static blade 20, (3) pivot point 48 at the connection between link 28 and the attachment portion 36 of the articulated blade 26, and (4) pivot point 50 at the connection between link 28 and the end portion 24.

Four links are defined between these rotational points: (1) an input link 54 is defined between pivot points 38 and 50, (2) a fixed link 56 is defined between pivot point 38 and rotation point 46, an output link 58 is defined between rotation point 46 and pivot point 48, and (4) a coupler link 60 is defined along link 28 between pivot points 48 and 50.

In a four-bar linkage setting, the input link is moved relative to the fixed link. This causes the coupler link to rotate or pivot, thus causing the connected output link to move. Particularly referring to the lopper 10, the fixed link 56 is held relatively motionless relative to the moving input link 54. Movement of the second handle 14, and thus the input link, causes the coupler link 60 to pivot about pivot point 50 and rotate about pivot point 38. Movement of the coupler link 60 causes the output link 58 to pivot about the rotation point 46. This moves the articulated blade 26 about the rotation point 44, moving the cutting edge 42 of the articulated blade 26 relative to the shearing edge 40 of the static blade 20. The four-bar linkage configuration of the lopper 10 provides mechanical advantages as explained above.

With the configurations explained above, the lopper 10 can be used for field dressing large animals, such as deer, elk, bears, and the like. Field dressing often involves cutting through bones (e.g., the pelvic bone) while the animal is held upright. The offset orientation of the blades allows the user to hold the lopper 10 out in front of his/her body with one handle above the other, and operate the lopper 10 to cut through the bones while the longitudinal axes of the blades 20, 26 are facing either upward or downward. In particular, if the handles 12, 14 of the loppers 10 are aligned vertically during field dressing with the animal held upright, the cutting edge 42 of the articulated blade 26 will be facing directly toward the animal, providing the user with leverage to cut the bone in a direction directly toward the animal while holding the lopper 10 in front of the user. This provides significant advantages over other cutting devices in which the longitudinal direction of the blades are generally aligned with the longitudinal axes of the handles. Furthermore, the cutting edge 42 is convex, the shearing edge 40 is concave, and both edges have a longitudinal central axis generally transverse to the longitudinal axis of the first handle 12. The convex cutting edge 42 faces directly toward the front of the bone or tissue of the animal when standing in front of the animal, as opposed to facing upward or downward. The convex cutting edge 42 can thus act as a knife cutting toward the animal while the user holds the lopper 10 in the orientation described above.

Figure 6:
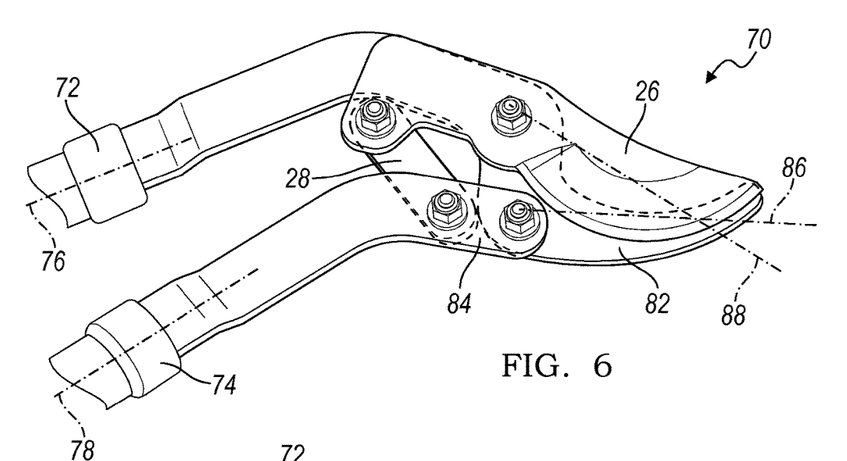
FIG. 6 is a partial perspective view of lopping shears in a closed position according to another embodiment.
Figure 7:
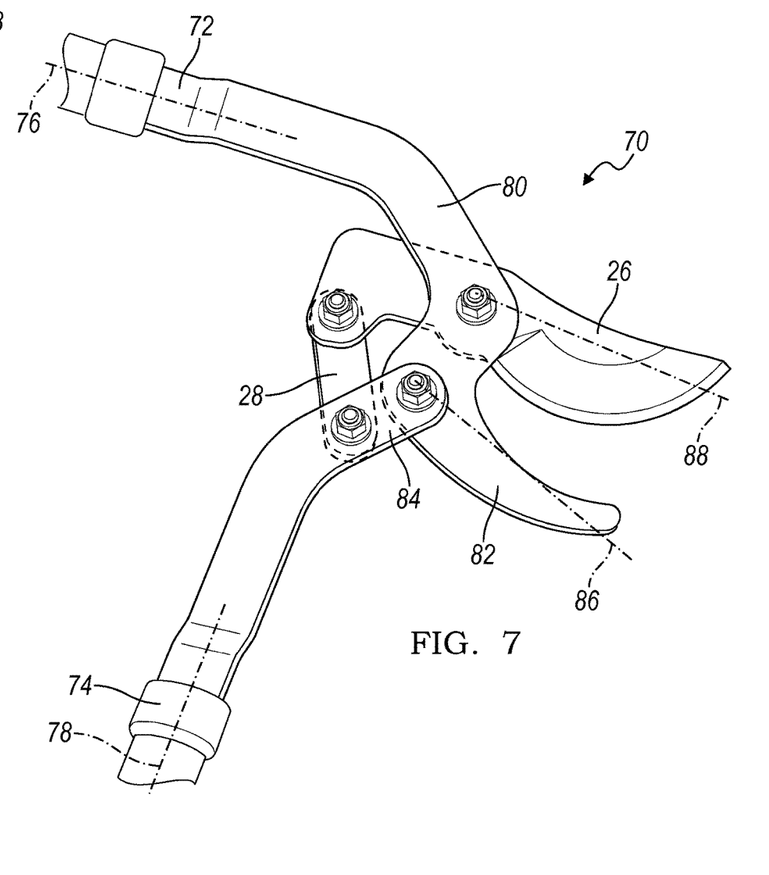
FIG. 7 is a partial perspective view of the lopping shears of FIG. 6 in an open position.

FIGS. 6 and 7 illustrate another embodiment in which the blades are offset from the handles at slightly less of an offset angle. This illustrated lopper 70 includes similar components as the lopper 10, except where the differences are described below. First handle 72 and second handle 74 are provided, each with respective longitudinal axes 76, 78. The first handle 72 includes a curved portion 80 that includes multiple curves, ending in a static blade 82. The articulated blade 26 is rotatably connected to the curved portion 80. Link 28 connects the articulated blade 26 to an end portion 84 of the second handle 74. The static blade 82 and the articulated blade 26 each have a respective longitudinal axis 86, 88.

In this embodiment, when in a closed position, the longitudinal axes 86, 88 may be angularly offset from longitudinal axes of the handles by an angle between 30 and 60 degrees, and more particularly between 40 and 50 degrees, and even more particularly by an angle of about 45 degrees. As the lopper 70 is opened, the angle between the longitudinal axis 88 of the articulated blade 26 and the longitudinal axis 78 of the second handle 74 increases toward 90 degrees.

In this embodiment, the blades can generally be referred to as offset from the handles, although at less of an offset angle compared to the embodiment in FIGS. 1-5. For example, the blades in FIGS. 1-5 may be offset by approximately 90 degrees from the handles when the handles are closed, compared to an approximate 45 degree offset in FIGS. 6 and 7. This reduced offset angle provides a benefit when trimming branches, limbs and the like that are directly overhead. With an approximate 45 degree angular offset, the user of the lopper 10 can stand further to the side of the limb when cutting the limb, avoiding the potential of the limb falling on top of the user. When compared to loppers that have blades extending along the longitudinal axes of the handles or approximately 90 degrees from the handles (like in FIGS. 1-5), the 45 degree offset loppers of FIGS. 6 and 7 allow the user to operate the loppers to cut overhead branches while standing at an increased distance away from the limb being cut.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. Lopping shears comprising:
   a first elongate handle extending along a first axis in a direction of a length of the first handle;
   a second elongate handle extending along a second axis in a direction of a length of the second handle that is generally parallel to the first axis when the shears are in a closed position;
   a static blade extending from the first handle;
   an articulated blade pivotally connected to the static blade; and
   a link pivotally connecting the articulated blade to an end portion of the second handle;
   wherein the static blade and the articulated blade extend in a direction generally perpendicular to the first axis when the lopping shears are in the closed position, and wherein the end portion of the second handle curves toward the static blade and ends at the static blade.

2. The shears of claim 1, wherein movement of the second handle relative to the first handle causes the end portion of the second handle and the link to rotate about the static blade such that the articulated blade rotates relative to the static blade.

3. The shears of claim 2, wherein the static blade has a concave shearing edge and the articulated blade has a convex cutting edge that moves toward and away from the concave shearing edge as the second handle moves relative to the first handle.

4. The shears of claim 3, wherein the first and second axes of the handles define two opposing spaces between the axes on opposing sides of a point of intersection of the axes, and wherein the shearing edge and the cutting edge are outside of the spaces when the lopping shears are in the closed position and an open position.

5. The shears of claim 1, wherein the static blade includes only one single blade such that a cutting force is realized between an interaction of the articulated blade and the single static blade.

6. A blade shear assembly comprising:
   first and second elongate handles coupled to one another and each extending along a longitudinal axis, the second handle having a linear main portion, a linear end portion, and a curved intermediate portion between the linear main portion and the linear end portion;
   a static blade having a longitudinal axis extending generally transverse from the longitudinal axis of the first handle, the static blade having a concave shearing edge, wherein the static blade is rotatably connected to the linear end portion of the second handle;
   an articulated blade rotatably connected to the static blade about an intermediate portion, the articulated blade having a first end and a second end extending in opposing directions from the intermediate portion, the first end having a convex cutting edge formed thereon and facing toward the concave shearing edge of the static blade such that the cutting edge and the shearing edge are offset from the longitudinal axes of the handles; and
   a generally linear link coupling the end portion of the second handle to the second end of the articulated blade;
   wherein movement of the second handle relative to the first handle causes the end portion and link to rotate about the static blade such that the articulated blade rotates relative to the static blade about the intermediate portion;
   wherein the longitudinal axes of the first and second handles extend infinitely and define a space between the axes, and wherein the cutting edge and the shearing edge are outside of the space when the blade shear assembly is in a closed position.

7. The blade shear assembly of claim 6, wherein the cutting edge and shearing edge each define respective longitudinal axes that extend at an angle between 85-95 degrees from a longitudinal axis of the first handle.

8. The blade shear assembly of claim 6, wherein the cutting edge and shearing edge each define respective longitudinal axes that extend at an angle between 40-50 degrees from a longitudinal axis of the first handle.

9. The blade shear assembly of claim 6, wherein a four-bar linkage assembly is defined by the end portion, the link, the articulated blade, and the static blade.

10. The blade shear assembly of claim 9, wherein the four-bar linkage further comprises
    an input link formed along the link, wherein the input link rotates about a portion of the static blade when the second handle is rotated relative to the first handle,
    a fixed link formed along the static blade,
    an output link formed along the articulated blade, and
    a coupler link formed along the link, the coupler link connecting the input link to the output link,
    wherein the output link pivots about the rotation point as the input link rotates about the attachment portion of the static blade when the second handle is rotated relative to the first handle.

11. The blade shear assembly of claim 6, wherein the end portion comprises a curved portion between two linear portions.

12. A blade shear assembly comprising:
    first and second elongated handles coupled to each other and each defining a longitudinal axis, the second handle having a curved end portion extending transverse to the longitudinal axis of the second handle;
    a static blade formed at an end of the first handle and having a shearing edge, the static blade pivotally and directly connected to the second handle at the curved end portion;
    an articulated blade rotatably connected to the static blade about a rotation point, the articulated blade having a cutting edge for cooperating with the shearing edge; and
    a link coupling the curved end portion of the second handle to the articulated blade to provide rotational movement of the articulated blade about the rotational point as the second handle is moved relative to the first handle.

13. The blade shear assembly of claim 12, wherein a four-bar linkage assembly is defined by
    an input link formed along the curved end portion, wherein the input link rotates about the portion of the static blade when the second handle is rotated relative to the first handle,
    a fixed link formed along the static blade,
    a coupler link formed along the link, and
    an output link formed along the articulated blade, wherein the coupler link connects the input link to the output link, and wherein the output link rotates about the rotation point as the input link rotates about the portion of the static blade when the second handle is rotated relative to the first handle.

14. The blade shear assembly of claim 13, wherein the shearing edge of the static blade and the cutting edge of the articulated blade extend generally transverse from the first elongate handle when the handle is in a closed position.

15. The blade shear assembly of claim 13, wherein the shearing edge of the static blade and the cutting edge of the articulated blade extend in an offset orientation away from a space between the first and second handles.

16. The blade shear assembly of claim 12, wherein the curved end portion of the second handle is coupled to an end of the second handle, and wherein the curved end portion is pivotally connected to the static blade and the link.

17. The blade shear assembly of claim 6, wherein the static blade includes only one single blade such that a cutting force is realized between an interaction of the articulated blade and the single static blade.

18. The blade shear assembly of claim 12, wherein the static blade includes only one single blade such that a cutting force is realized between an interaction of the articulated blade and the single static blade.

\* \* \* \* \*

UNITED STATES PATENT AND TRADEMARK OFFICE
CERTIFICATE OF CORRECTION

PATENT NO. : 9,603,310 B2  
APPLICATION NO. : 14/497750  
DATED : March 28, 2017  
INVENTOR(S) : James M. Sampson et al.

It is certified that error appears in the above-identified patent and that said Letters Patent is hereby corrected as shown below:

Column 9, Line 13, Claim 17:  
After "The blade shear assembly of claim"  
Delete "6" and  
Insert -- 1 --.

Signed and Sealed this  
Sixth Day of June, 2017

Michelle K. Lee  
*Director of the United States Patent and Trademark Office*